United States Patent
Toda

(10) Patent No.: US 10,594,933 B2
(45) Date of Patent: Mar. 17, 2020

(54) MONITORING SYSTEM AND IMAGE PROCESSING METHOD

(71) Applicant: HITACHI KOKUSAI ELECTRIC INC., Tokyo (JP)

(72) Inventor: Kazuhiro Toda, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 16/065,229

(22) PCT Filed: Dec. 15, 2016

(86) PCT No.: PCT/JP2016/087367
§ 371 (c)(1),
(2) Date: Jun. 22, 2018

(87) PCT Pub. No.: WO2017/115663
PCT Pub. Date: Jul. 6, 2017

(65) Prior Publication Data
US 2019/0020815 A1    Jan. 17, 2019

(30) Foreign Application Priority Data
Dec. 28, 2015   (JP) .................................. 2015-255977

(51) Int. Cl.
*H04N 5/232*     (2006.01)
*H04N 7/18*      (2006.01)
(Continued)

(52) U.S. Cl.
CPC ......... *H04N 5/23232* (2013.01); *H04N 5/265* (2013.01); *H04N 5/272* (2013.01); *H04N 7/18* (2013.01); *H04N 7/183* (2013.01)

(58) Field of Classification Search
CPC .... H04N 5/23232; H04N 5/232; H04N 5/265; H04N 5/272; H04N 7/18; H04N 7/183
See application file for complete search history.

(56) References Cited

U.S. PATENT DOCUMENTS

2004/0062439 A1* 4/2004 Cahill ....................... G06T 5/50
                                                     382/173
2005/0243169 A1* 11/2005 Ono ........................ H04N 7/183
                                                     348/65
(Continued)

FOREIGN PATENT DOCUMENTS

JP    2000_105137 A    4/2000
JP    2000_215059 A    9/2000
(Continued)

OTHER PUBLICATIONS

International Search Report issued in International Appln. No. PCT/JP2016/087367 dated Dec. 15, 2016.

*Primary Examiner* — Jonathan R Messmore
(74) *Attorney, Agent, or Firm* — Bacon & Thomas, PLLC

(57) ABSTRACT

A monitoring system includes an imaging device, a recording device and a monitoring device. The imaging device is configured to image a monitoring target. The recording device is configured to stores image data captured by the imaging device. The monitoring device is configured to generate a composite image data by combining the image data captured by the imaging device and an image data, having the same view angle as that of the captured image data, read out from the recording device and to generate an edge cutout rectangle image data by connecting luminance change points exceeding a predetermined threshold value, starting from a predetermined point in the composite image data.

3 Claims, 8 Drawing Sheets

(51) Int. Cl.
*H04N 5/272* (2006.01)
*H04N 5/265* (2006.01)

(56) References Cited

U.S. PATENT DOCUMENTS

2010/0235053 A1* 9/2010 Iwakiri ................ B62D 15/027
 701/42
2016/0259992 A1* 9/2016 Knodt .................. G06K 9/6201

FOREIGN PATENT DOCUMENTS

| JP | 2001_43383 A | 2/2001 |
| JP | 2003_140544 A | 5/2003 |

* cited by examiner

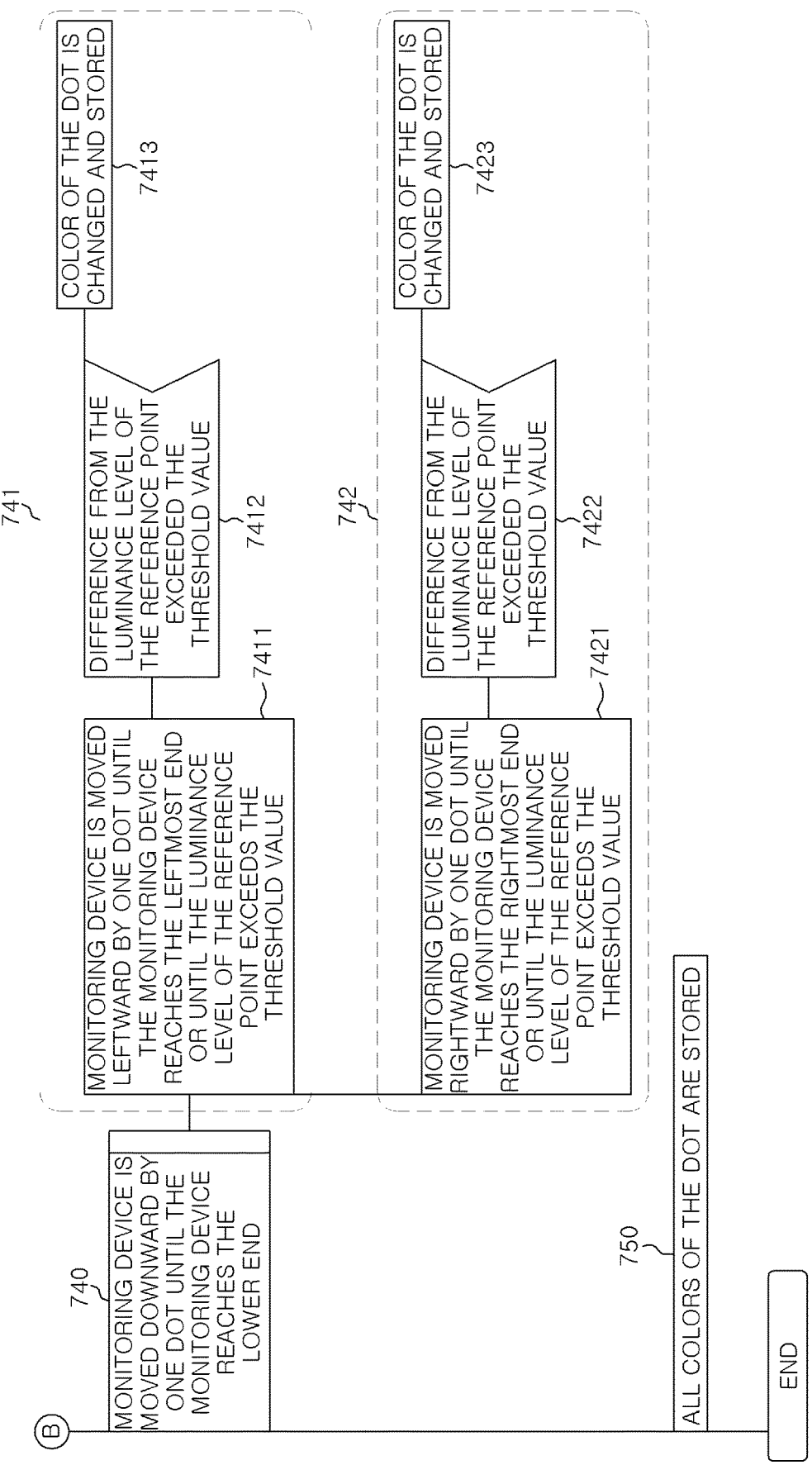

MONITORING SYSTEM AND IMAGE PROCESSING METHOD

FIELD OF THE INVENTION

The present invention relates to a monitoring system and an image processing method.

BACKGROUND OF THE INVENTION

Conventionally, monitoring of uplift of a lava dome is mostly dependent on sense of an observer who is monitoring a camera image. A snapshot image of the camera image which is obtained by manual operation at an irregular interval is preserved by printing or the like. When images need to be compared, it is required to find a slight difference between the images by naked eyes. In addition, when a lava dome and a mountain ridge are detected from images, image changes are misidentified due to changes caused by the intensity of sunlight or changes in the luminance depending on time zones, weather, and seasons.

As for a conventional technique, Japanese Patent Application Publication No. 2003-139532 discloses a method including: measuring a latitude, a longitude, and an altitude of an imaging position; obtaining at the imaging position a picture image including an imaging target region, a specific point of the imaging target region, and a skyline; obtaining a picture image skyline from the picture image; obtaining a skyline on a map showing the imaging target from the imaging position by using known terrain elevation data; obtaining a coordinate transformation formula by matching the picture image skyline with the skyline on the map; and converting a picture image taken at the imaging position into a map (orthographic image) viewed from above in a vertical direction by using the coordinate transformation formula.

As for another conventional technique, Japanese Patent Registration No. 4220140 discloses an apparatus including a TV camera configured to monitor a mountain shape and an image processing unit configured to perform predetermined image processing based on a video signal from the TV camera. The image processing unit measures the amount of planar changes of the countour of the mountain shape before and after the change of the mountain shape by using the video signal from the TV camera, and map information having a GIS function is stored in a storage unit. A three-dimensional collapse amount is measured by overlapping images obtained by the TV camera on a digital map stored in the storage unit.

Conventionally, live image monitoring and image preservation using cameras have been performed to detect signs of natural disasters such as volcanic eruption, rock collapse, flooding of rivers and the like. However, there is no system having a function capable of easily comparing images of the same view angle stored at a regular interval.

SUMMARY OF THE INVENTION

In view of the above, the present invention provides a technique for detecting signs of natural disasters by periodically storing captured images and comparing shape changes in lava domes, ridges, rocks, and the like.

In accordance with an aspect of the present invention, there is provided a monitoring system including: an imaging device configured to image a monitoring target; a recording device configured to stores image data captured by the imaging device; and a monitoring device configured to generate a composite image data by combining the image data captured by the imaging device and an image data, having the same view angle as that of the captured image data, read out from the recording device and to generate an edge cutout rectangle image data by connecting luminance change points exceeding a predetermined threshold value, starting from a predetermined point in the composite image data.

The monitoring device may superimpose an imaging date or comments as additional information on the composite image data and stores the composite image data in the recording device.

In accordance with another aspect of the present invention, there is provided an image processing method including: generating a composite image data by combining a live image data and a stored image data; and generating an edge cutout rectangle image data by connecting luminance change points exceeding a predetermined threshold value, starting from a predetermined point in the composite image data.

In accordance with the present invention, it is possible to detect signs of natural disasters by periodically storing captured images and comparing shape changes in lava domes, ridges, rocks, and the like.

BRIEF DESCRIPTION OF THE DRAWINGS

FIGS. 7A to 7C are a processing flowchart for explaining edge cutting processing of the luminance point of the monitoring device according to the embodiment.

DETAILED DESCRIPTION OF THE EMBODIMENTS

Hereinafter, embodiments will be described in detail with reference to the accompanying drawings.

Figure 9:
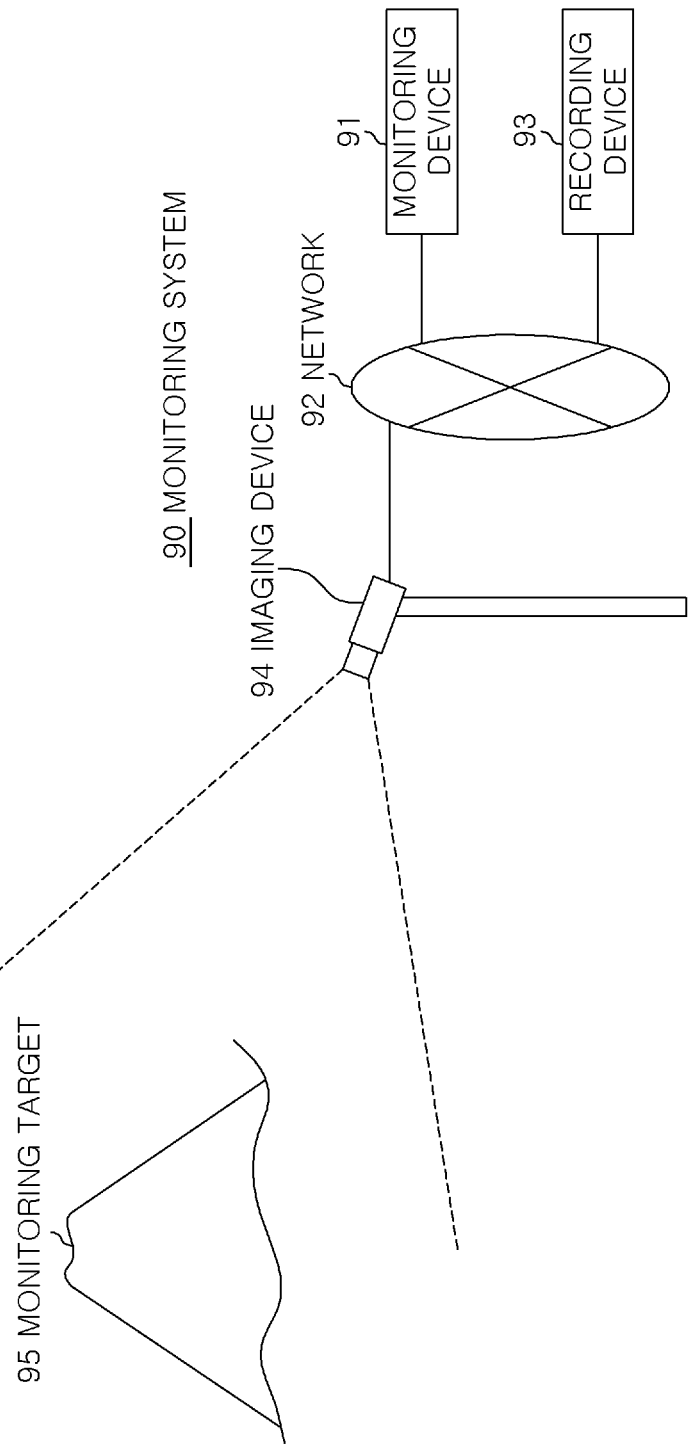
FIG. 9 explains a monitoring system according to an embodiment.

FIG. 9 explains a monitoring system according to an embodiment of the present invention.

Referring to FIG. 9, the monitoring system 90 includes a monitoring device 91, a network 92, a recording device 93, and an imaging device 94.

The monitoring device 91 is a PC (Personal Computer) or the like capable of performing image processing, and may have therein the recording device 93 for storing image data.

A monitoring target 95 may be, e.g., mountains, lava domes, ridges, rocks, rivers, and the like where natural disasters may occurs.

The recording device 93 obtains image data of the monitoring target 95 which has been captured by the imaging The monitoring device 91 superimposes an imaging date, comments and the like as additional information inputted in a comment input field 43 on the captured image data captured by the imaging device 94 or the stored image data stored in the recording device 93, and stores them in the recording device 93. The additional information is used for searching to be performed later or for ensuring traceability until disasters occurs.

Figure 5:
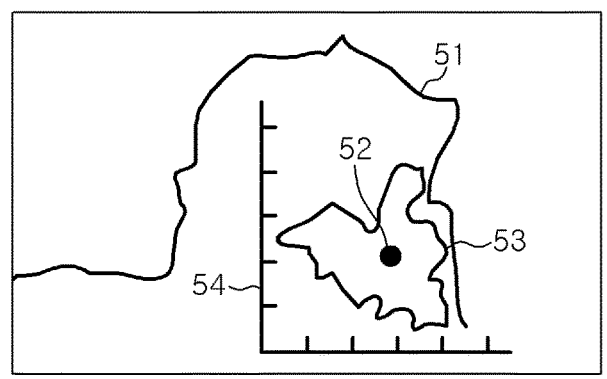
FIG. 5 explains a measuring scale of the monitoring device according to the embodiment.

FIG. 5 explains a measuring scale of the monitoring device according to the embodiment of the present invention.

Figure 3:
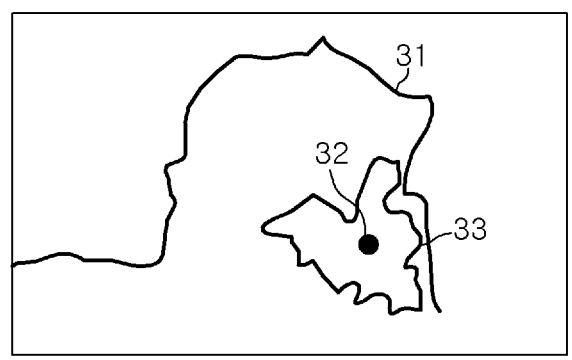
FIG. 3 explains an edge cutout image of a luminance point of the monitoring device according to the embodiment.
Figure 4:
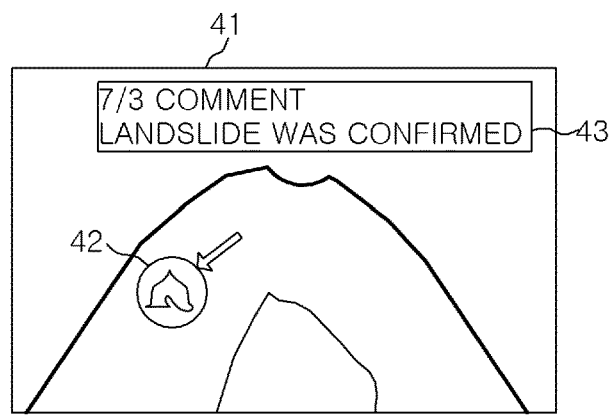
FIG. 4 explains traceability of the monitoring device according to the embodiment.

The monitoring device 91 superimposes a measuring scale 54 on an image data 51 (31 in FIG. 3) of the same lava dome as that in the image data of FIG. 3. The measuring scale 54 can be obtained from a view angle or a zoom magnification of the imaging device 94, a distance to the subject, or the like, The monitoring device 91 can measure a size of an edge cutout rectangle 53 based on the measurement scale 54.

The reference point 52 is the same as the reference point 52 in FIG. 3.

Figure 6:
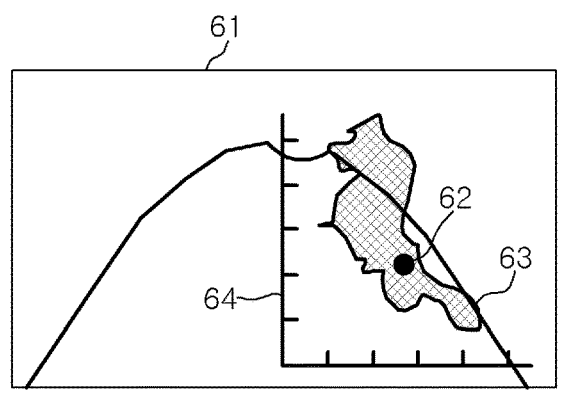
FIG. 6 explains a measuring scale of the monitoring device according to the embodiment.

FIG. 6 explains a measuring scale of the monitoring device according to the embodiment of the present invention.

In FIG. 6, a summit eruption image 61 is a captured. image data captured by the imaging device 94.

The monitoring device 91 generates an edge cutout rectangle 63 related to the eruption from the summit eruption image 61 based on the luminance change point, superimposes the edge cutout rectangle 63 on the summit eruption image 61, and further superimposes a measurement scale 64 thereon. The measuring scale 64 can be obtained from a view angle or a zoom magnification of the imaging device 94, a distance to the subject, or the like.

The monitoring device 91 can measure a size of the edge cutout rectangle 63 based on the measurement scale 64

The reference point 62 is a marker marked by an observer at an arbitrary position on the image.

Figure 1C:
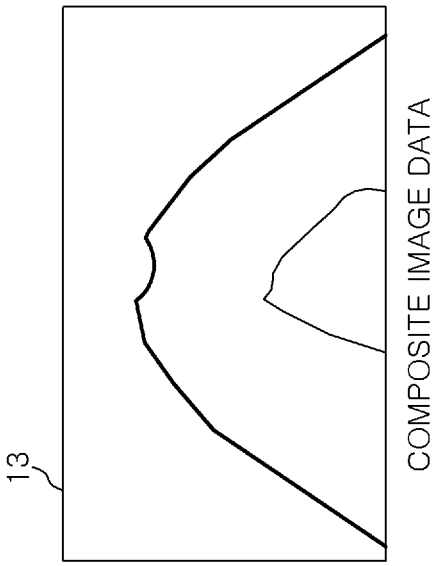
FIGS. 1A to 1C explain image comparison of monitoring device according to an embodiment of the present invention.
Figure 1A:
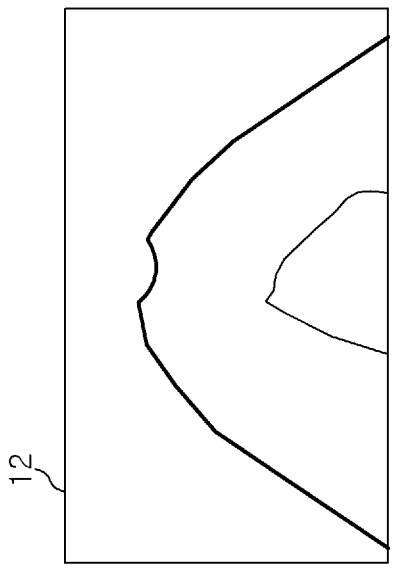
Figure 1B:
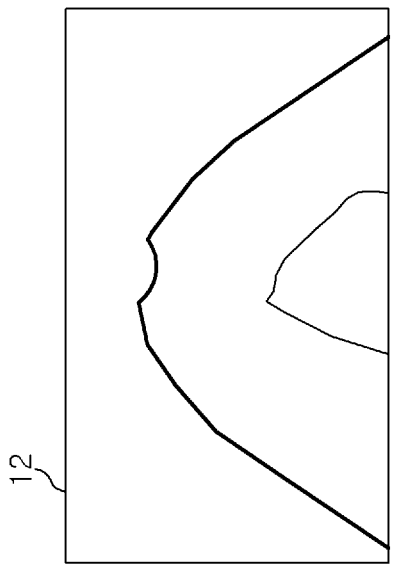
Figure 2:
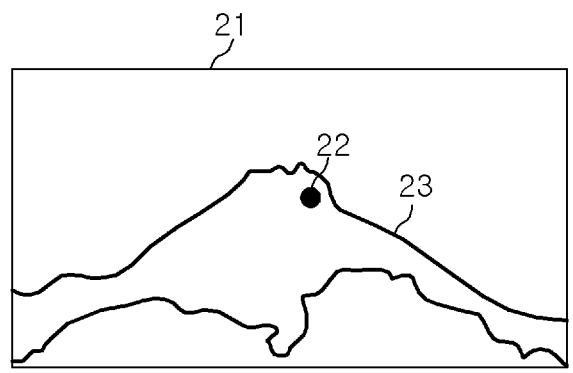
FIG. 2 explains an edge cutout image of a luminance point of the monitoring device according to the embodiment.

In the edge cutting processing (FIGS. 2 and 3) performed based on the luminance change point in the above-described image processing, an observer may cut an unintended portion. For example, the effect of luminance on the imaging target varies due to changes caused, by the intensity of sunlight or changes depending on time zones, weather and seasons. Therefore, when the edge is automatically cutout by using the luminance difference, the edge cutting range may be changed.

Next, an embodiment for solving the above problem will be described with reference to FIGS. 7A to 7C and 8.

Figure 7A:
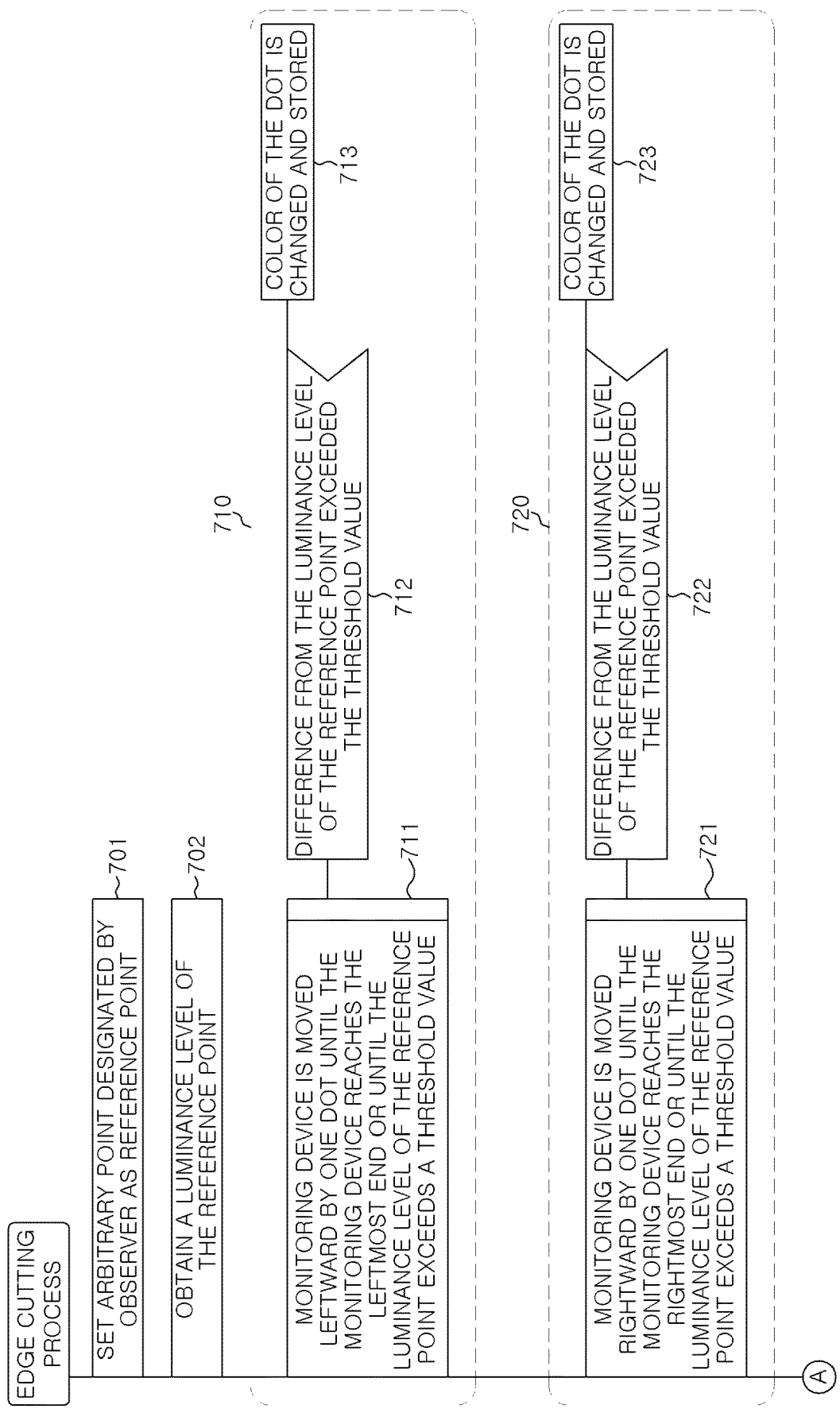
Figure 7B:
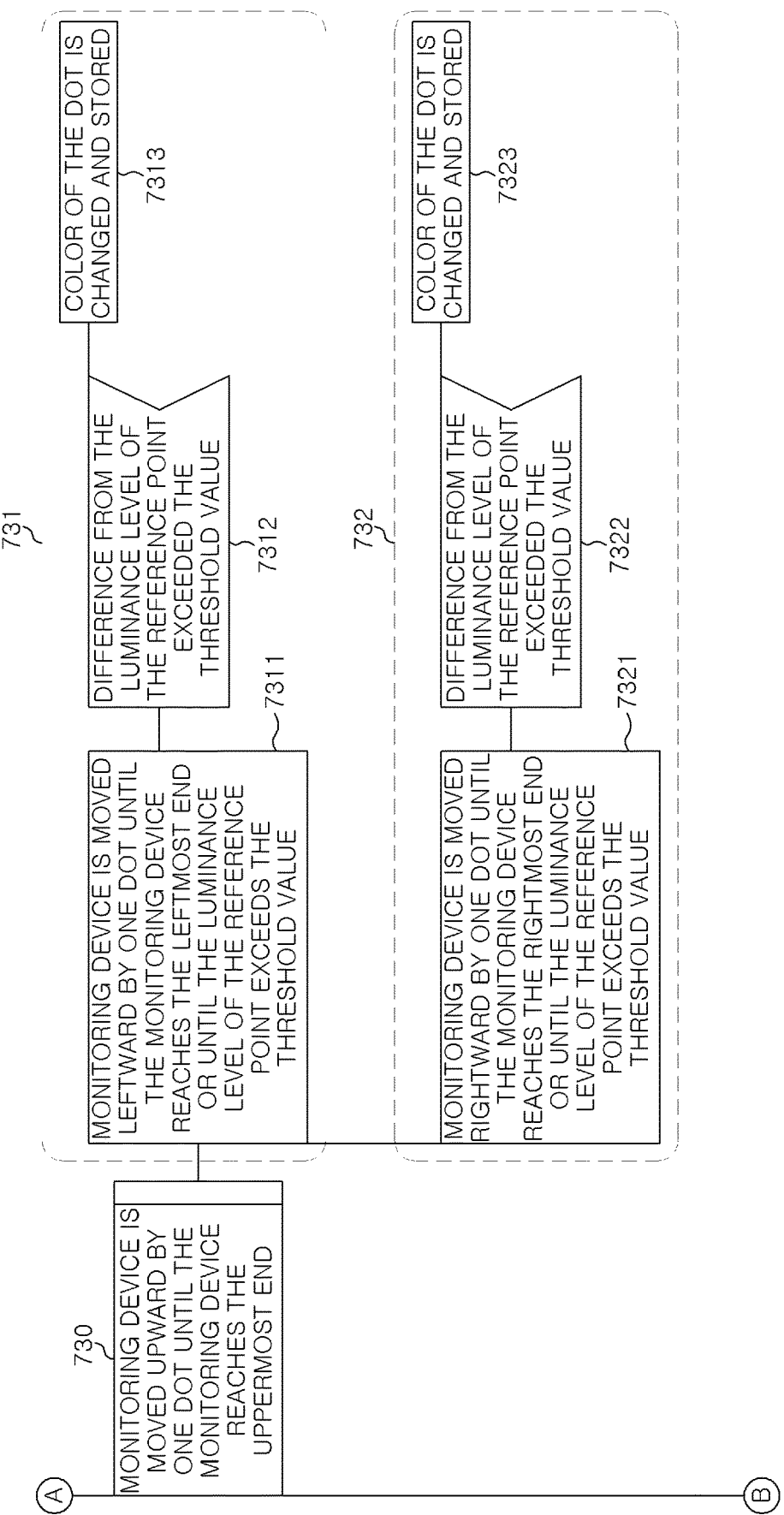
Figure 8:
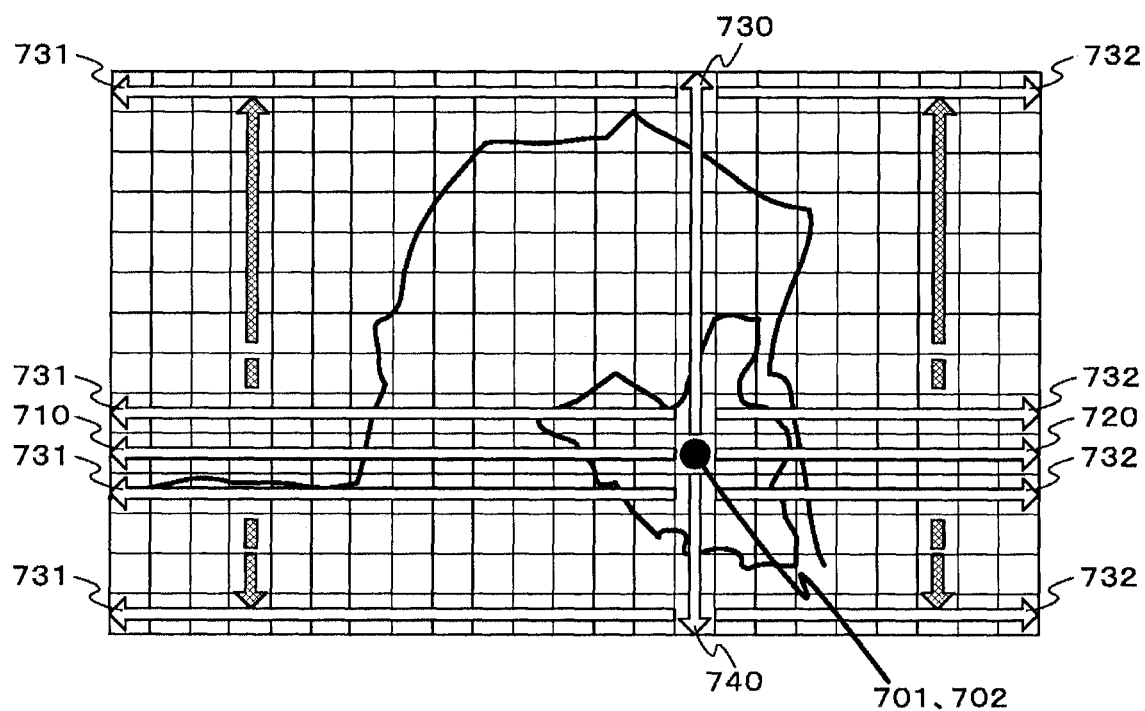
FIG. 8 shows an image for explaining the edge cutting processing of the luminance point of the monitoring device according to the embodiment.

FIGS. 7A to 7C are a processing flow chart for explaining the edge cutting process for the luminance point of the monitoring device according to the embodiment of the present invention. FIG. 8 shows an image for explaining the edge cutting process for the luminance point of the monitoring device according to the embodiment of the present invention on the image.

The processing flowchart of FIGS. 7A to 7C is expressed by PAD (Problem Analysis Diagram).

The monitoring device 91 sets an arbitrary point of the image data designated by an observer as a reference point. (701) and displays the reference point in, e.g., blue. The monitoring device 91 obtains a luminance level of the reference point (702).

Next, in the processing of 710, the monitoring device 91 is moved leftward in a horizontal direction by one dot using the reference point as a starting point until the monitoring device 91 reaches the leftmost end or until the luminance level of the reference point exceeds a threshold value (711).

When it is determined in the processing of 711 that the difference from the luminance level of the reference point exceeds the threshold value (712), the monitoring device 91 changes the color of the dot to, e.g., red, at the point where the difference exceeds the threshold value and stores it in the recording device 93 (713). When the monitoring device 91 reaches the leftmost end, the color of the dot is not changed.

Next, in the processing of 720, the monitoring device 91 is moved rightward in the horizontal direction by one dot at a time from the reference point until the monitoring device 91 reaches the rightmost end or until the luminance level of the reference point exceeds the threshold value (721).

When it is determined in the processing of 721 that the difference from the luminance level of the reference point exceeds the threshold value (722), the monitoring device 91 changes the color of the dot to, e.g., green, at the point where the difference exceeds the threshold value and stores it in the recording device (723). When the monitoring device 91 reaches the rightmost end, the color of the dot is not changed.

Next, the monitoring device 91 is moved upward by one dot at a time from the reference point until the monitoring device 91 reaches the uppermost end (730).

In the processing of 730, the monitoring device 91 performs processing of 731 and processing of 732.

In the processing of 731, the monitoring device 91 is moved leftward in the horizontal direction by one dot using the reference point as a starting point until the monitoring device 91 reaches the leftmost end or until the luminance level of the reference point exceeds the threshold value (7311). When it is determined that the difference from the luminance level of the reference point exceeds the threshold value (7312), the monitoring device 91 changes the color of the dot to, e.g., magenta, at the point where the difference exceeds the threshold value and stores it in the recording device 93 (7313). When the monitoring device 731 reaches the leftmost end, the color of the dot is not changed.

In the processing of 732, the monitoring device 91 is moved rightward in the horizontal direction by one dot using the reference point as a starting point until the monitoring device 91 reaches the rightmost end or the luminance level of the reference point exceeds the threshold value (7321). When it is determined that the difference from the luminance level of the reference point exceeds the threshold value (7322), the monitoring device 91 changes the color of the dot to, e.g., cyan, at the point where the difference exceeds the threshold value and stores it in the recording device 93 (7323). When the monitoring device 91 reaches the rightmost end, the color of the dot is not changed.

Next, the monitoring device 91 is moves downward by one dot using the reference point as a starting point until the monitoring device 91 reaches the lowermost portion (740).

In the processing of 740, the monitoring device 91 performs processing of 741 and processing of 742.

In the processing of 741, the monitoring device 91 is moves leftward in the horizontal direction by one dot using the reference point as a starting point until the monitoring device 91 reaches the leftmost end or until the luminance level of the reference point exceeds the threshold value (7411). When it is determined that the difference from the luminance level of the reference point exceeds the threshold value (7412), the monitoring device 91 changes the color of the dot to, e.g., yellow, at the point where the difference exceeds the threshold value and stores it in the recording device 93 (7413). When the monitoring device 91 reaches the leftmost end, the color of the dot is not changed.

In the processing of 742, the monitoring device 91 is moved rightward in the horizontal direction by one dot using the reference point as a starting point until the monitoring device 91 reaches the rightmost end or until the luminance level of the reference point exceeds the threshold value (7421). When it is determined that the difference from the luminance level of the reference point exceeds the threshold value (7422), the monitoring device 91 changes the color of the dot to, e.g., purple, at the point where the difference exceeds the threshold value and stores it in the recording device 93 (7423). When the monitoring device 91 reaches the rightmost end, the color of the dot is not changed.

Next, the monitoring device 91 connects dot positions of all colors stored in the recording device 93 and stores them as one rectangle in the recording device 93.

Next, another embodiment in which the monitoring device 91 performs image comparison or edge cutting (area comparison) by using stored image data captured at the same time every day will be described.

In a step 1, the monitoring device 91 receives an imaging view angle (panning, tilting and zooming), an imaging date, and designation of a reference point to which a luminance value is applied and which serves as a reference at the time of performing edge cutting.

In a step 2, the monitoring device 91 inputs a recording schedule to the recording device 93 in order to record a high-definition still image in the recording device 93 at a designated imaging time.

In a step 3, the monitoring device 91 monitors whether the imaging device 94 captures images as scheduled and the recording device 93 stores them as scheduled. At this time, the monitoring device 91 may perform super-resolution correction or heat haze correction by using a plurality of temporally adjacent images and store the result image in the recording device 93.

In a step 4, the monitoring device 91 allows an observer to activate the function of the image comparison or the edge cutting.

In a step 4-1, the monitoring device 91 performs high-precision view angle matching between a plurality of high-definition still images stored in the recording device 93. When the imaging device 94 is a PTZ (Pan, Tilt and Zoom) camera, positional errors and zoom magnification errors may occur due to accuracy problems even if it is returned to the same position after the operation. Therefore, the errors are compensated based on one image (e.g., the earliest image). As for a method of detecting errors of the parallel movement and the magnification, it is possible to use a known phase restricting correlation method or a method of detecting an image feature point (corner or the like) and tracking its position. Helmert transformation can be used for correction based on the detection result.

In a step 4-2, the monitoring device 91 performs the image comparison or the edge cutting in response to the manipulation of the observer. The processing contents are the same as those described in FIGS. 7A to 7C.

The monitoring system according to the embodiment of the present invention can detect signs of natural disasters by periodically storing the captured images of the imaging device and comparing shape changes in lava dome, ridges, rocks, and the like.

While one embodiment of the present invention has been described in detail, the present invention is not limited thereto, and various modifications can be made without departing from the spirit of the present invention.

INDUSTRIAL APPLICABILITY

The present invention may be used for checking a position where changes have occurred by performing edge cutting based on the luminance change point from the composite image data obtained by combining two image data.

DESCRIPTION OF REFERENCE NUMERALS

11: live image data
12: stored image data
13: composite image data
21: captured image data
22: reference point
23: edge cutout rectangle
31: rock image
32: reference point
33: edge cutout rectangle
41: mountain image
42: marking range
43: comment input field
51: rock image
52: reference point
53: edge cutout rectangle
54: measuring scale
61: summit eruption image
62: reference point
63: edge cutout rectangle
64: measuring scale
90: monitoring system
91: monitoring device
92: network
93: recording device
94: imaging device
95: monitoring target

What is claimed is:

1. A monitoring system comprising:
    an imaging device configured to image a monitoring target;
    a recording device configured to stores image data captured by the imaging device; and
    a monitoring device configured
        to generate a composite image data by combining the image data captured by the imaging device and an image data, having the same view angle as that of the captured image data, read out from the recording device,
        to set a point in the composite image data, wherein the point is designated by a user as a reference point, and
        to generate an edge cutout rectangle image data by connecting luminance change points exceeding a predetermined threshold value, starting from the reference point in the composite image data.

2. The monitoring system of claim 1, wherein the monitoring device superimposes an imaging date or comments as additional information on the composite image data and stores the composite image data in the recording device.

3. An image processing method comprising:
    generating a composite image data by combining a live image data and a stored image data;
    setting a point in the composite image data, wherein the point is designated by a user as a reference point; and
    generating an edge cutout rectangle image data by connecting luminance change points exceeding a predetermined threshold value, starting from the reference point in the composite image data.

* * * * *